US012514781B2

(12) United States Patent
Zhang

(10) Patent No.: US 12,514,781 B2
(45) Date of Patent: Jan. 6, 2026

(54) MASSAGER WITH PLURALITY OF MASSAGE MODES AND MASSAGE METHOD

(71) Applicant: Xiaobin Zhang, Yingshan (CN)

(72) Inventor: Xiaobin Zhang, Yingshan (CN)

( * ) Notice: Subject to any disclaimer, the term of this patent is extended or adjusted under 35 U.S.C. 154(b) by 0 days.

(21) Appl. No.: 18/786,714

(22) Filed: Jul. 29, 2024

(65) Prior Publication Data

US 2024/0382376 A1 Nov. 21, 2024

(51) Int. Cl.
*A61H 23/00* (2006.01)
*A61H 15/00* (2006.01)
*A61H 23/02* (2006.01)

(52) U.S. Cl.
CPC ..... *A61H 23/0254* (2013.01); *A61H 15/0085* (2013.01); *A61H 2201/1215* (2013.01); *A61H 2201/149* (2013.01)

(58) Field of Classification Search
None
See application file for complete search history.

(56) References Cited

U.S. PATENT DOCUMENTS 6,190,307 B1 * 2/2001 Tsai ....................... A61H 19/34 601/51
7,341,566 B2 * 3/2008 Nan ....................... A61H 19/44 601/72
8,152,746 B2 * 4/2012 Nan ................... A61H 23/0263 600/38
9,119,765 B2 * 9/2015 Topolev ................. A61H 19/44
9,655,808 B2 * 5/2017 Peddicord .............. A61H 19/00
9,730,857 B1 * 8/2017 Loya ...................... A61H 21/00
9,737,457 B2 * 8/2017 Allen ..................... A61H 23/02
9,737,458 B1 * 8/2017 Olivares ................ A61H 21/00
10,940,078 B1 * 3/2021 Lee ........................ A61H 19/34
11,123,259 B2 * 9/2021 Baetica .................. G08C 17/02
11,369,545 B1 * 6/2022 He ......................... A61H 7/005
12,064,386 B1 * 8/2024 Yan ........................ A61H 23/02
2011/0230802 A1 * 9/2011 Nan ....................... A61H 19/30 601/46

(Continued)

FOREIGN PATENT DOCUMENTS

CN 208364720 U † 1/2019
DE 202024100299 U1 † 4/2024
TW M399714 U † 3/2011

*Primary Examiner* — LaToya M Louis
(74) *Attorney, Agent, or Firm* — Yong Chen

(57) ABSTRACT

The present invention relates to a massager with a plurality of massage modes and a massage method. The massager comprises an outer housing, a control board arranged in the outer housing, and a battery and a control button which are connected to the control board, wherein a handle is formed at one end of the outer housing, a charging port for charging the battery is arranged on the handle, at least one group of massagers are also arranged on the outer housing, one group of massagers comprises a first vibration motor and a transmission mechanism connected to the first vibration motor, at least one group of massage columns are arranged at an end portion of the transmission mechanism, and the massage columns are moved by the transmission mechanism when the first vibration motor is working.

18 Claims, 15 Drawing Sheets

(56) References Cited

U.S. PATENT DOCUMENTS

| | | | | |
|---|---|---|---|---|
| 2012/0316390 | A1* | 12/2012 | Topolev | A61H 19/30 600/38 |
| 2013/0023807 | A1 | 1/2013 | Hennessey | |
| 2013/0178769 | A1* | 7/2013 | Schmidt | A61H 23/0263 601/46 |
| 2014/0213846 | A1* | 7/2014 | Lee | A61H 23/0263 600/38 |
| 2014/0236151 | A1* | 8/2014 | Lee | A61H 23/0254 600/38 |
| 2014/0378758 | A1* | 12/2014 | Mankin | A61H 19/44 600/38 |
| 2016/0051438 | A1* | 2/2016 | Hahr | A61H 23/0263 601/72 |
| 2016/0120737 | A1* | 5/2016 | Sedic | A61H 23/0263 601/46 |
| 2016/0166466 | A1* | 6/2016 | Topolev | A61H 23/0263 601/46 |
| 2016/0367431 | A1* | 12/2016 | Ferrari | A61H 19/44 |
| 2017/0095399 | A1* | 4/2017 | Lee | A61H 19/50 |
| 2017/0239135 | A1* | 8/2017 | Pearson | A61H 19/44 |
| 2017/0266076 | A1* | 9/2017 | Chen | A61H 19/34 |
| 2017/0367925 | A1* | 12/2017 | Allen | A61H 19/34 |
| 2018/0140504 | A1* | 5/2018 | Chang | A61H 99/00 |
| 2020/0100982 | A1* | 4/2020 | Lee | A61H 23/02 |
| 2021/0077341 | A1† | 3/2021 | Tang | |
| 2021/0212888 | A1* | 7/2021 | Zipper | A61H 19/44 |
| 2021/0308000 | A1* | 10/2021 | Sedic | A61H 23/0263 |
| 2021/0338523 | A1* | 11/2021 | Zheng | A61H 19/44 |
| 2021/0393475 | A1* | 12/2021 | He | A61H 19/34 |
| 2023/0277408 | A1 | 9/2023 | Luo | |
| 2023/0355466 | A1 | 11/2023 | Cheng | |
| 2024/0050307 | A1* | 2/2024 | Luo | A61H 19/44 |
| 2024/0189176 | A1* | 6/2024 | Liu | A61H 19/44 |

* cited by examiner
† cited by third party

MASSAGER WITH PLURALITY OF MASSAGE MODES AND MASSAGE METHOD

TECHNICAL FIELD

The present invention relates to the field of adult product massagers, and in particular, to a massager with a plurality of massage modes and a massage method.

BACKGROUND

With the improvement of living standards and the increase of people's life and work pressure, adult health care products are becoming more and more popular, and people are also putting more and more energy in their own health and comfort of the life process. In this environment, various health care and massage products specifically for adults are popularized and applied, among which a simulation female massager is a very common product, which provides single adult women or women who have been separated from their spouses for a long time with the possibility of relieving some of the pressure. The conventional simulation massager not only comprises a simulation massage body, but also is internally provided with a vibration motor, which is driven by the motor to achieve active massage. This massager greatly improves the convenience of use and enhances comfort. However, the conventional massager usually has only one vibration massage function, which has a poor effect when used for massage. In addition, the massage effect is reduced after long-term use of the same massage manner, resulting in a poor massage experience.

SUMMARY

The technical problem to be solved by the present invention is that the conventional massager usually has only one vibration massage function, which has a poor effect when used for massage, and the massage effect is reduced after long-term use of the same massage manner, resulting in a poor massage experience. Aiming at the above defect in the prior art, a negative pressure massager and a massage method are provided.

To solve the above technical problem, the present invention adopts the following technical solutions.

A massager with a plurality of massage modes is constructed, which comprises: an outer housing, a control board arranged in the outer housing, and a battery and a control button which are connected to the control board, wherein a handle is formed at one end of the outer housing, a charging port for charging the battery is arranged on the handle, at least one group of massagers are also arranged on the outer housing, one group of massagers comprises a first vibration motor and a transmission mechanism connected to the first vibration motor, at least one group of massage columns are arranged at an end portion of the transmission mechanism, the massage columns are moved by the transmission mechanism when the first vibration motor is working, and end portions of the massage columns protrude from the outer housing and move along with the massage columns to achieve moving massage.

A massage method is constructed, wherein the massage method is based on the massager with multifunctional massage modes, and the massager is driven by the control button to perform massage in at least one or more of the plurality of massage modes simultaneously.

The present invention has the beneficial effects that: a plurality of massage modes are provided on the massager, and the plurality of massage modes can perform massage operations simultaneously in structure, so that the massage effect is better. The plurality of massage modes comprise moving massage, rotating massage and sliding massage, each massage mode has an optimal massage effect on specific parts, the massage effect is more significant, and the use is more convenient.

DETAILED DESCRIPTION OF EMBODIMENTS

Figure 1:
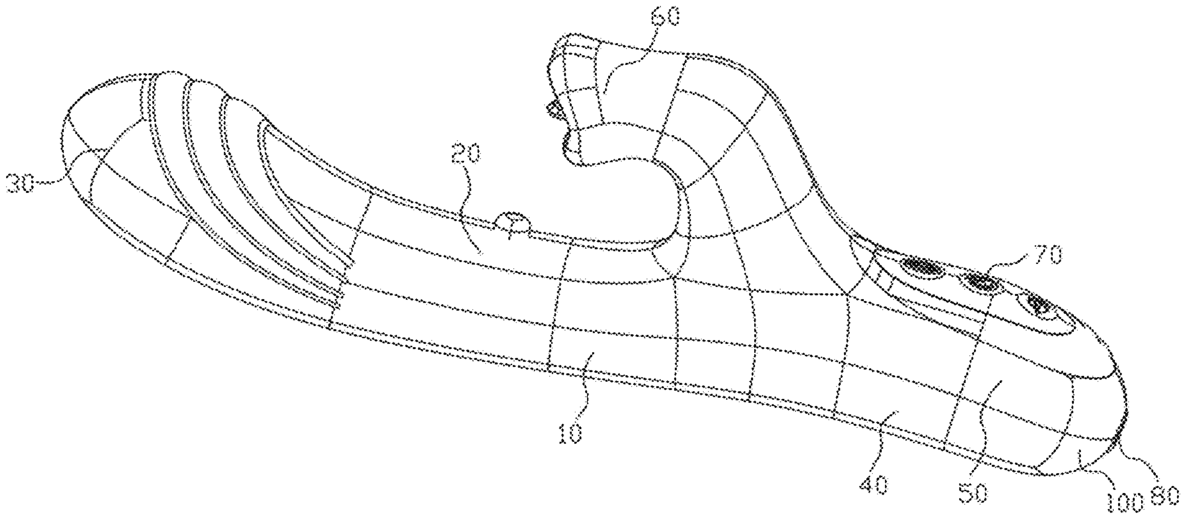
FIG. 1 is a three-dimensional structural diagram of a massager according to the present invention.
Figure 2:
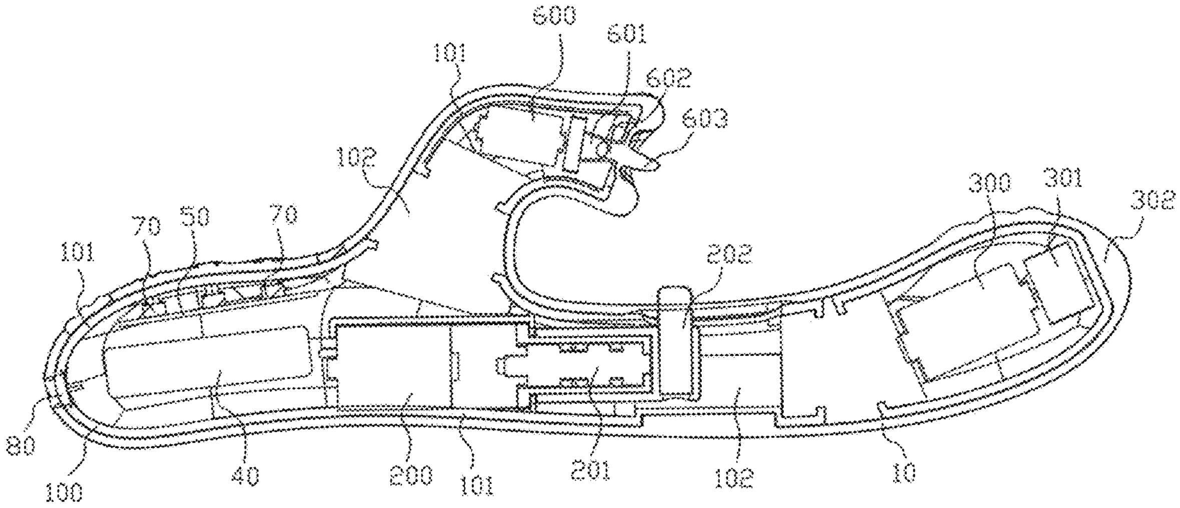
FIG. 2 is a cross-sectional structural diagram of a massager according to the present invention.
Figure 3:
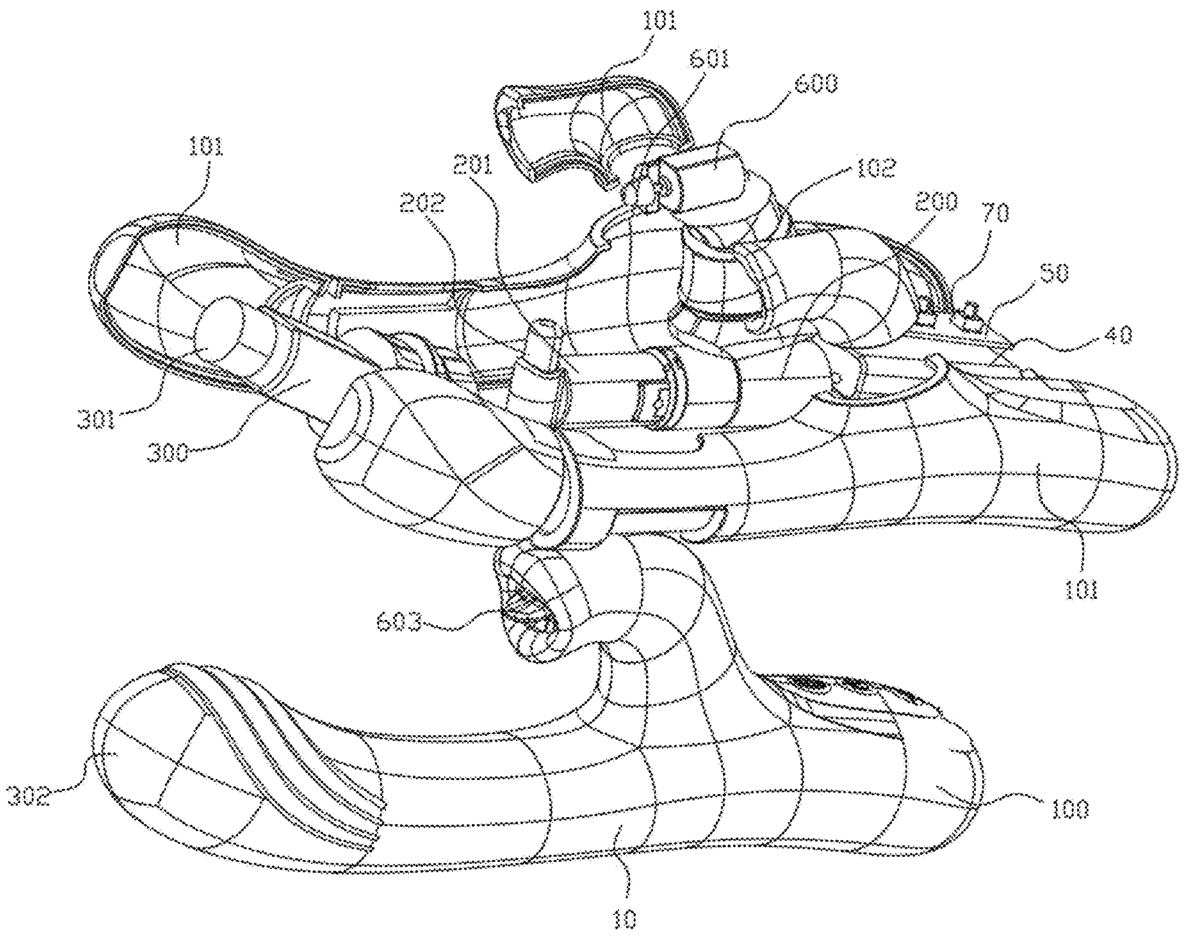
FIG. 3 is an exploded structural diagram of a massager according to the present invention.

A massager with a plurality of massage modes according to a preferred embodiment of the present invention, as shown in FIG. 1, comprises an outer housing 10, the outer housing is in a "Y" shape as a whole, a first support leg forms a handle 101, a battery 40 and a control board 50 connected to the battery are arranged in the handle, three groups of control buttons 60 connected to the control board are arranged on the outer housing, a charging head 80 is arranged at an end portion of the handle, and the charging head can charge the battery in a magnetic charging mode. A third massage portion 60 is arranged at an end portion of a second support leg, a second massage portion 30 is arranged at an end portion of a third support leg, and the second massage portion is arranged at a middle part of the third support leg. When the massager is used, the third support leg is inserted, the first massage portion 20 and the second massage portion 30 massage the inside, and the third massage portion 60 massages the outside, thereby forming various massage modes. Three groups of control buttons are arranged corresponding to the three massage portions to adjust the massage intensity of the corresponding massage portions respectively.

Specifically, as shown in FIGS. 2 to 3 and 6 to 7, an inner housing 101 is further arranged in the outer housing 10, and the inner housing wraps the three groups of massage portions to reduce the transmission of vibration to the outer housing during the operation of the massage portions. The first massage portion 20 comprises a first vibration motor 200 and a transmission mechanism 201 driven by the first vibration motor, a massage column 202 is connected to an end portion of the transmission mechanism, the massage column protrudes from a surface of the outer housing, and the massage column moves to perform moving massage when the first massage portion works; the second massage portion 30 comprises a second vibration motor 300 and a rotating massage block 301 driven by the second vibration motor, an end portion of the outer housing is provided with a second massage portion 302 corresponding to the rotating massage block, and the second massage portion performs rotating massage through the rotation of the rotating block; and the third massage portion 60 comprises a third vibration motor 600 and a rotating massage column 601 driven by the third vibration motor, an end portion of the outer housing is provided with a convex tongue 603 corresponding to the rotating massage column, an inner convex ball 602 in contact with the rotating massage column is arranged inside the convex tongue, and the convex tongue moves up and down for message through the rotation of the rotating massage column. To avoid the mutual influence among a plurality of groups of massage portions, an isolating member 102 is arranged in the inner housing 101 to isolate the plurality of groups of massage portions.

Figure 4:
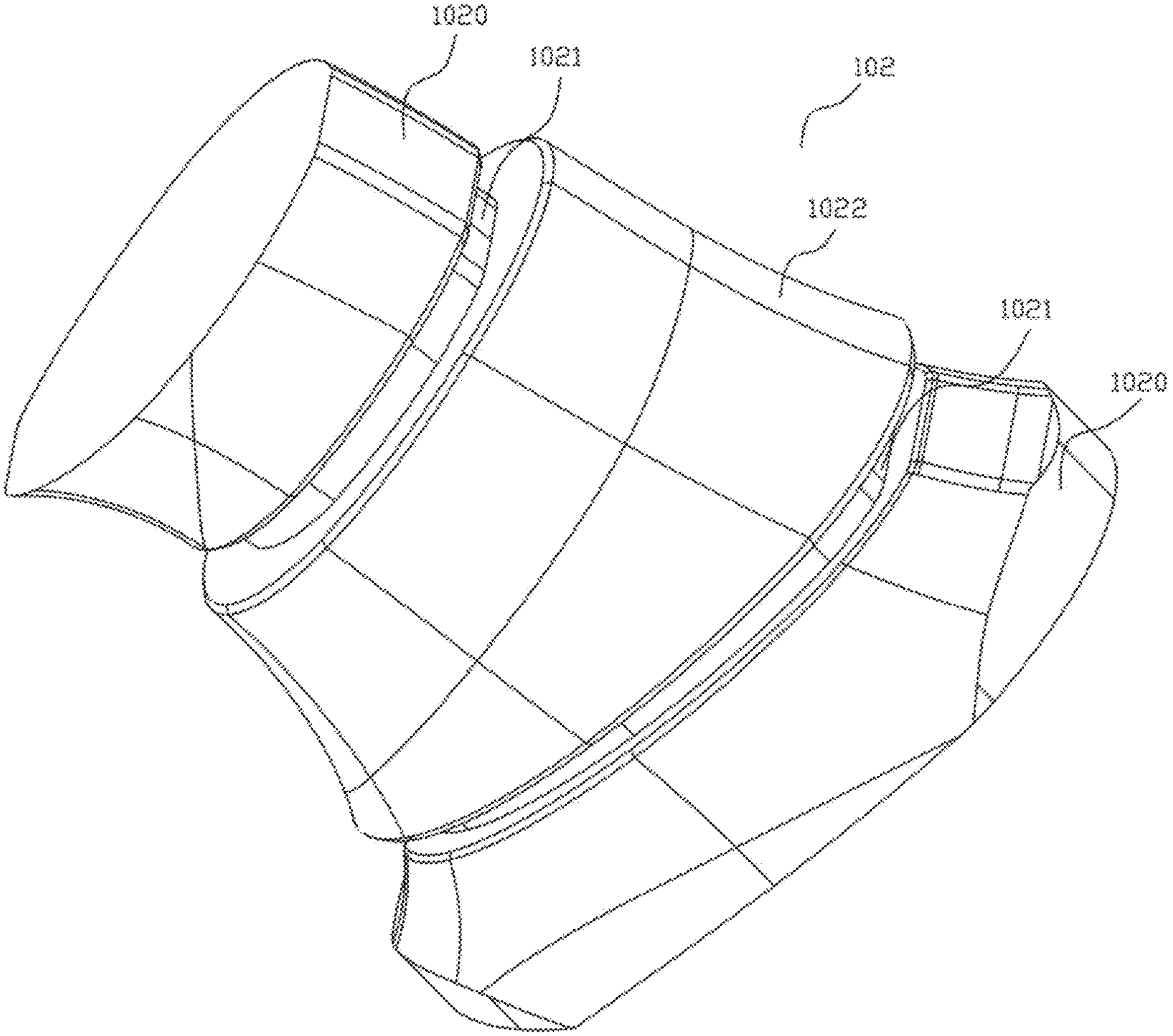
FIG. 4 is a structural diagram of an isolating member according to the present invention.
Figure 5:
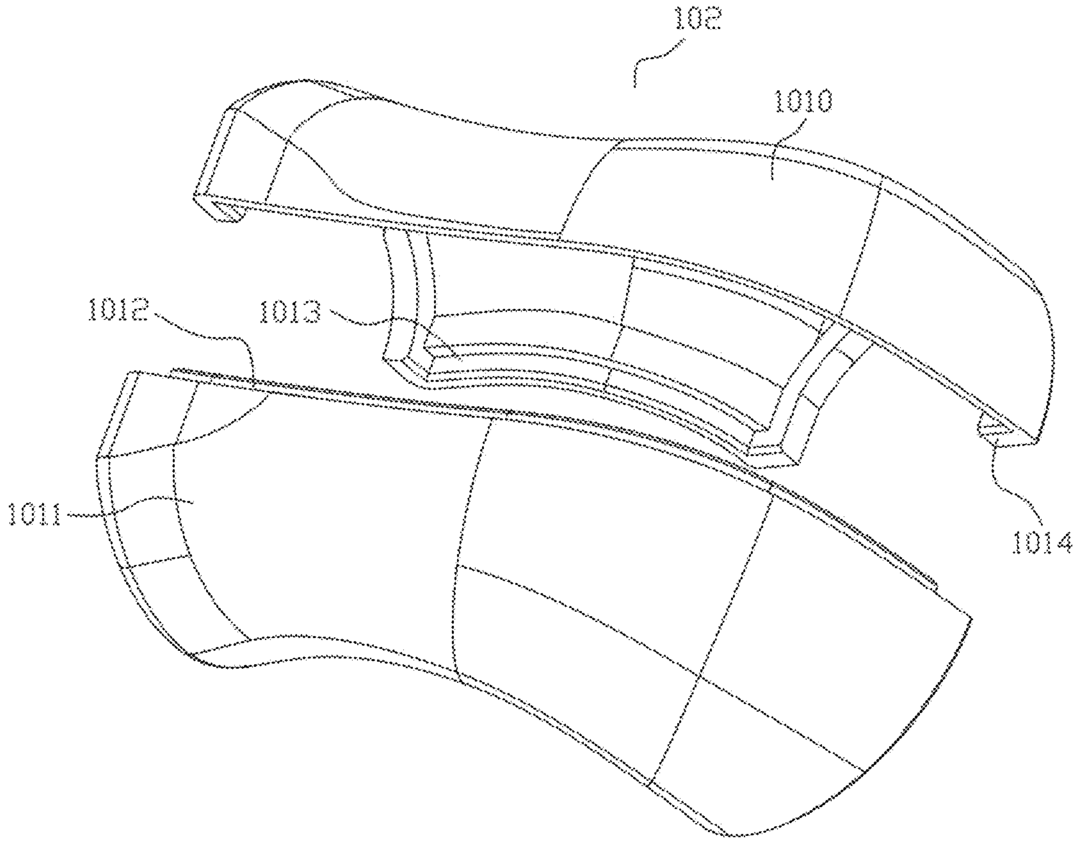
FIG. 5 is a structural diagram of an inner housing according to the present invention.
Figure 6:
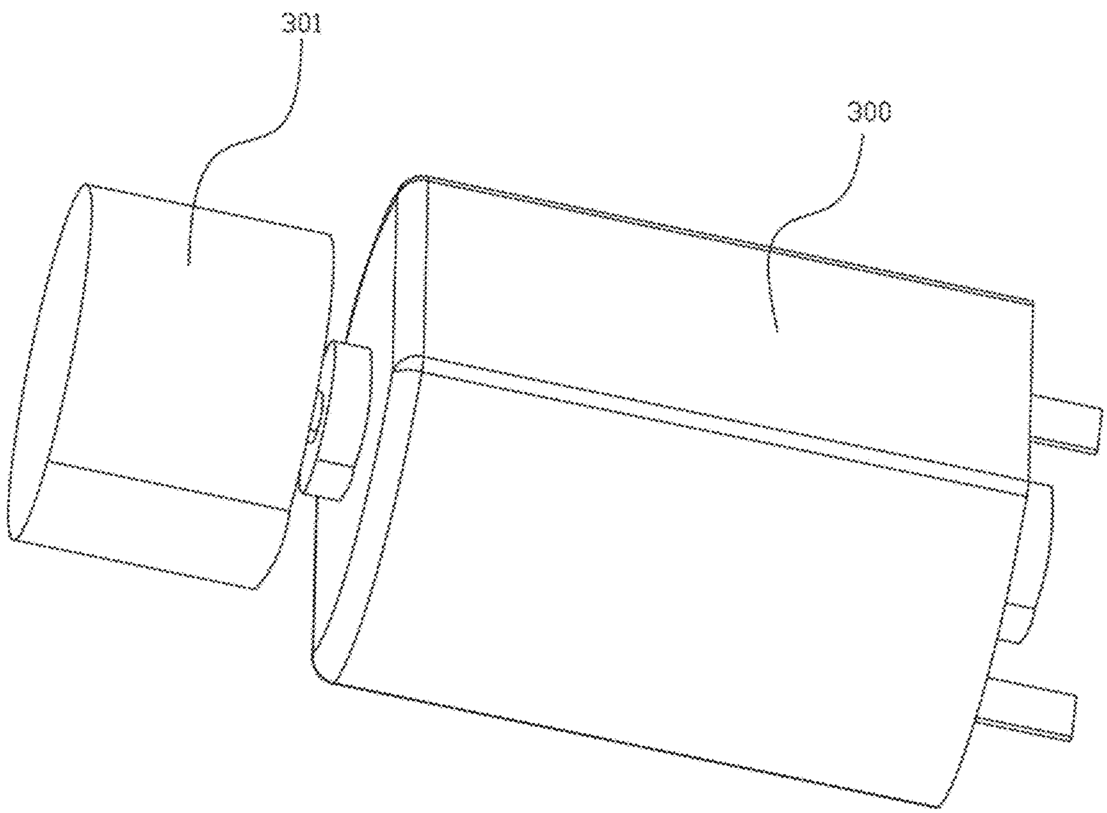
FIG. 6 is a partial structural diagram of a second massager according to the present invention.
Figure 7:
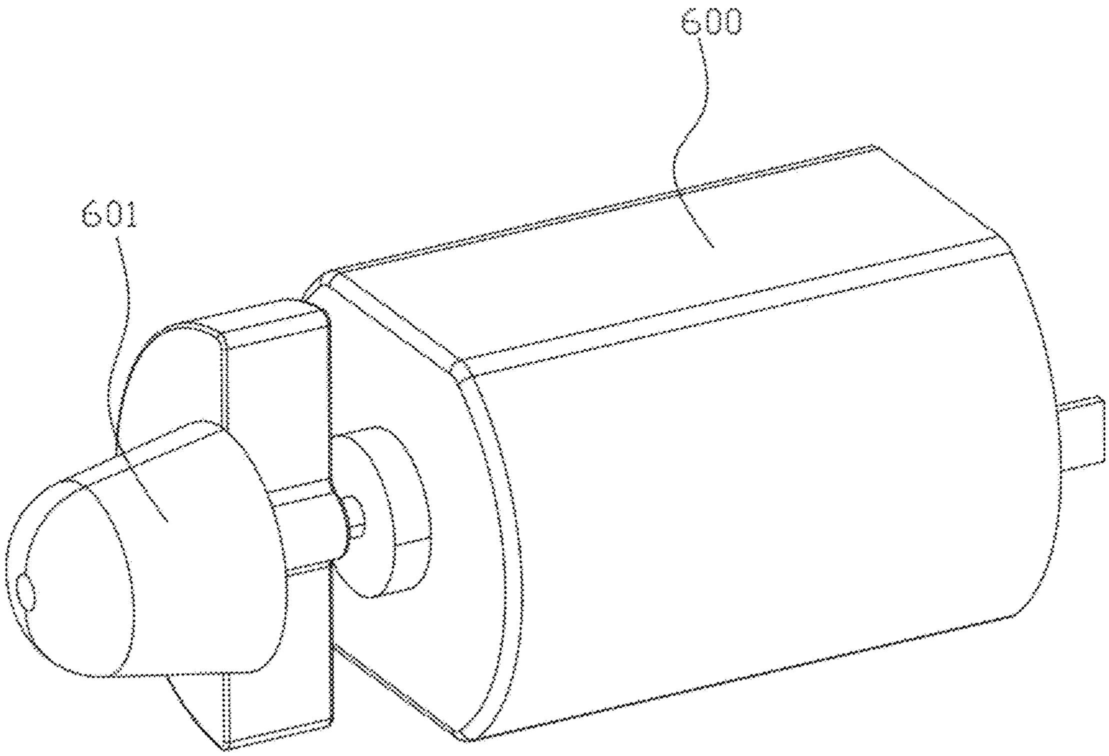
FIG. 7 is a partial structural diagram of a third massager according to the present invention.

Further, as shown in FIGS. 4 to 5, a connecting end 1022 is arranged in the middle of the isolating member 102, fixed ends 1020 are arranged at two sides of the connecting end, and a connecting groove 1021 is arranged between the connecting end and the fixed end. The inner housing 101 is formed by connecting a left inner housing 1010 and a right inner housing 1011, a connecting column 1014 is arranged on the inner housing corresponding to the connecting groove, the connecting column is inserted into the connecting groove to connect the inner housing and the isolating member, and the opposite surfaces of the left inner housing and the right inner housing are connected and sealed through a flange 1012 and a lower step 1013, so that the sealing performance of the inner housing is improved, the inner housing and the isolating member are connected more stably, the mutual influence of vibration work among the plurality of groups of massage portions is avoided, and the massage effect is better.

Figure 8:
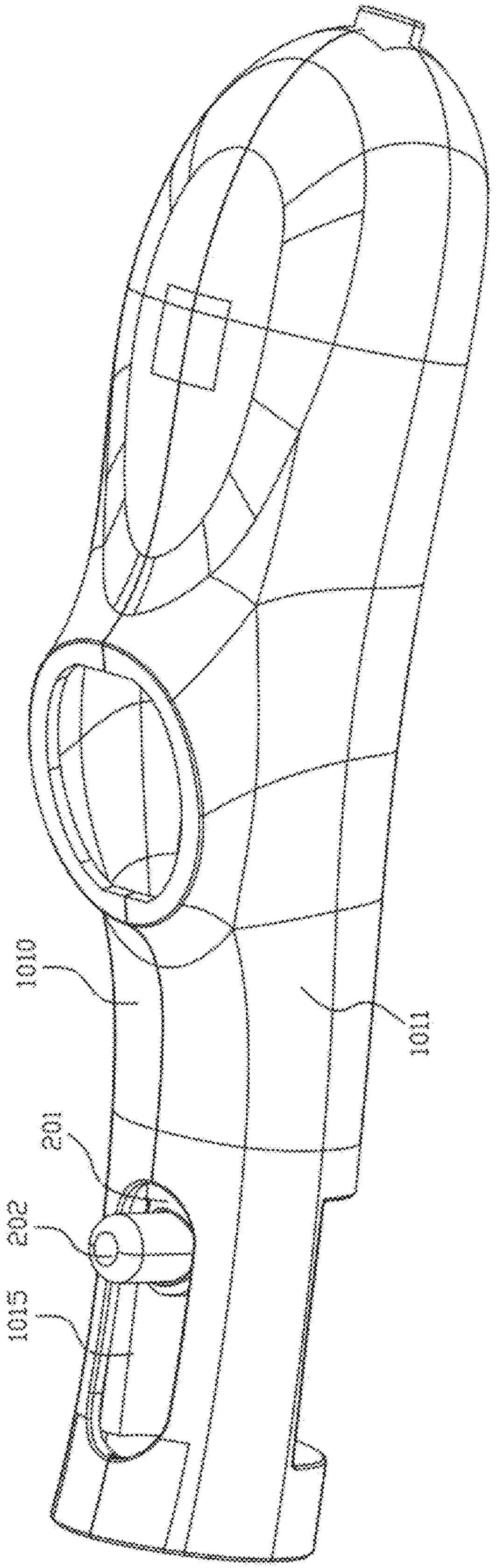
FIG. 8 is a structural diagram of a connection between a first massager and an inner housing according to the present invention.
Figure 9:
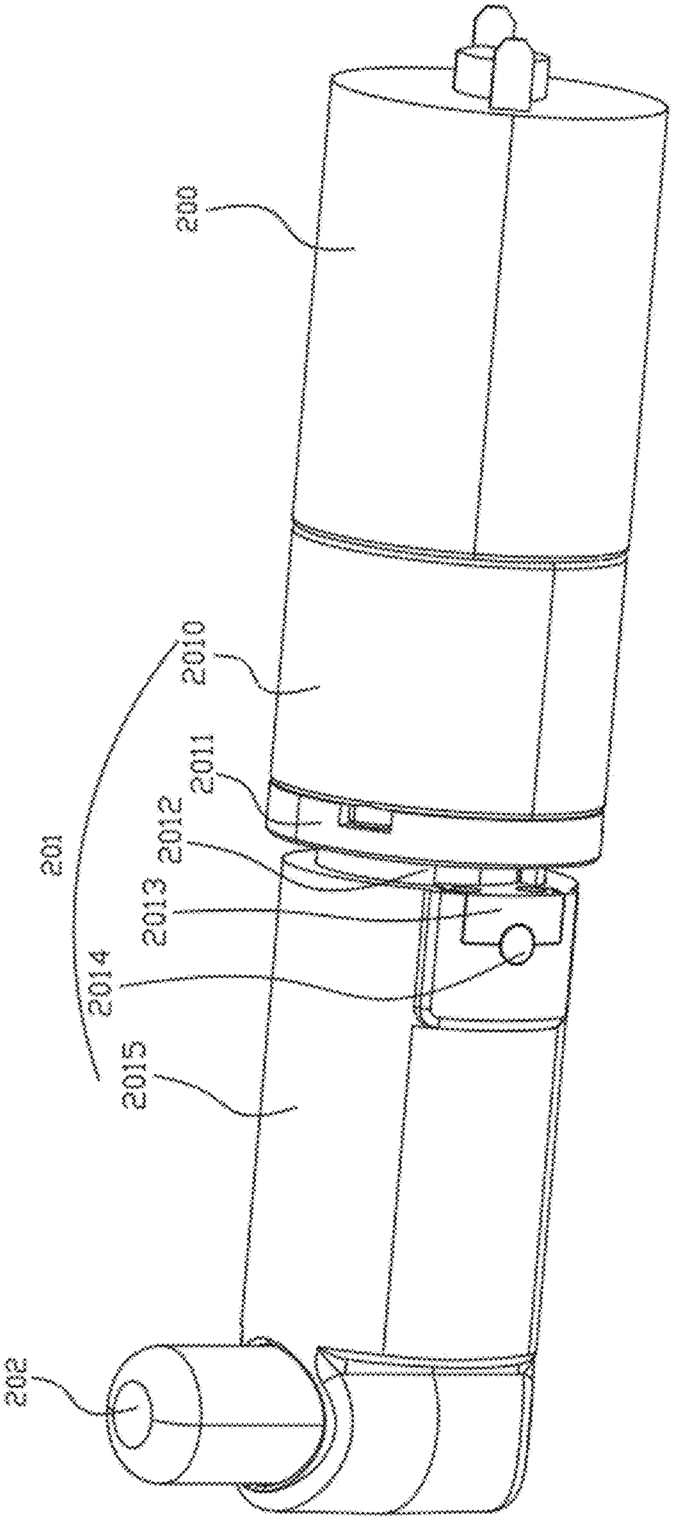
FIG. 9 is a structural diagram of a first massager according to the present invention.
Figure 10:
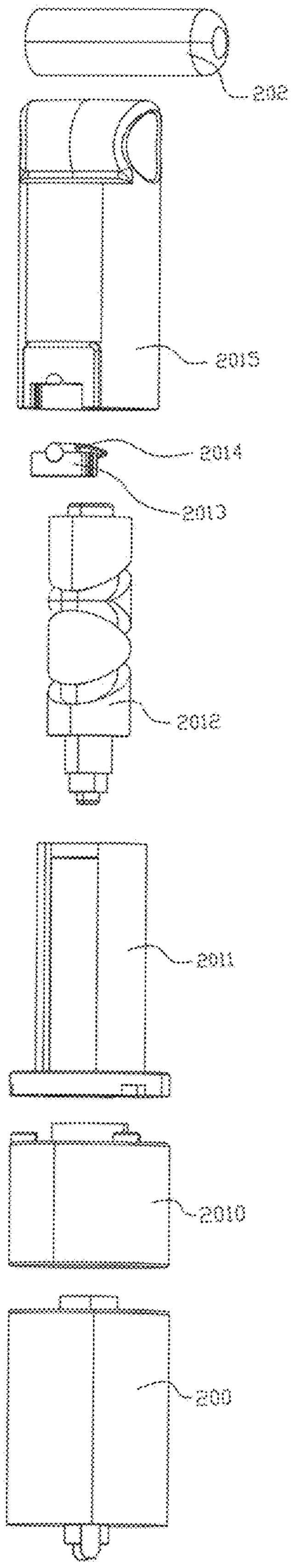
FIG. 10 is an exploded diagram of a first massager according to the present invention.
Figure 11:
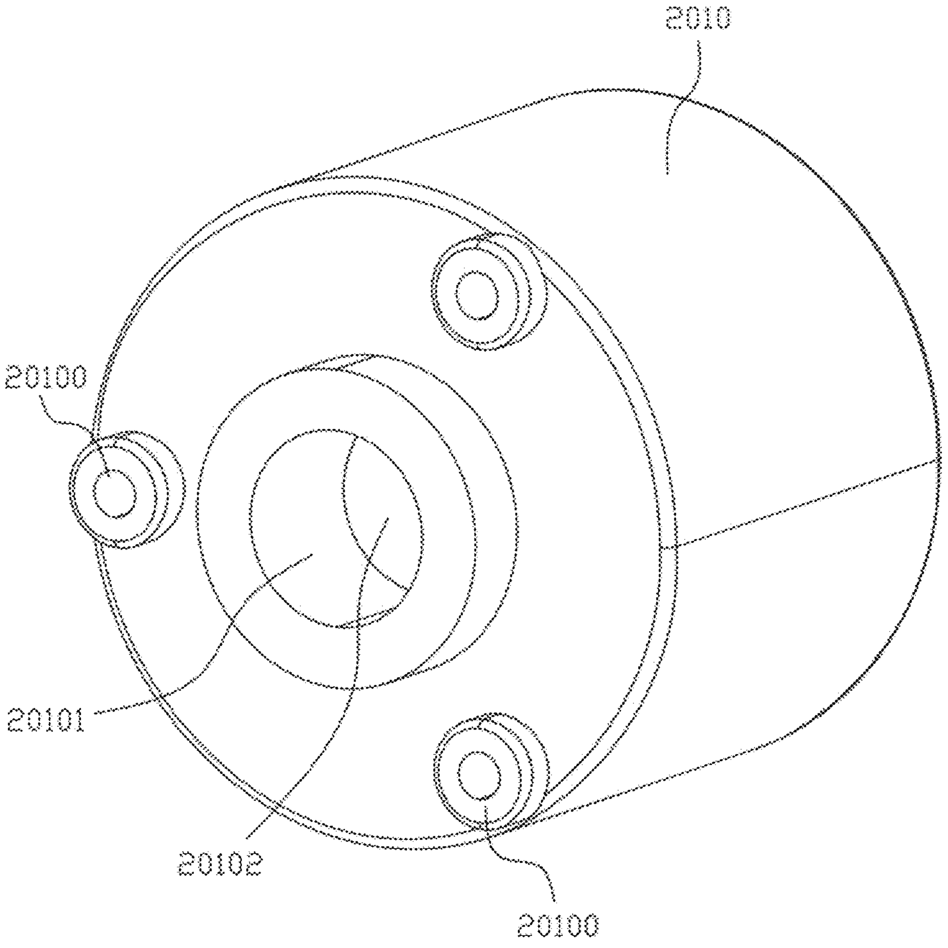
FIG. 11 is a structural diagram of a rotating block according to the present invention.
Figure 12:
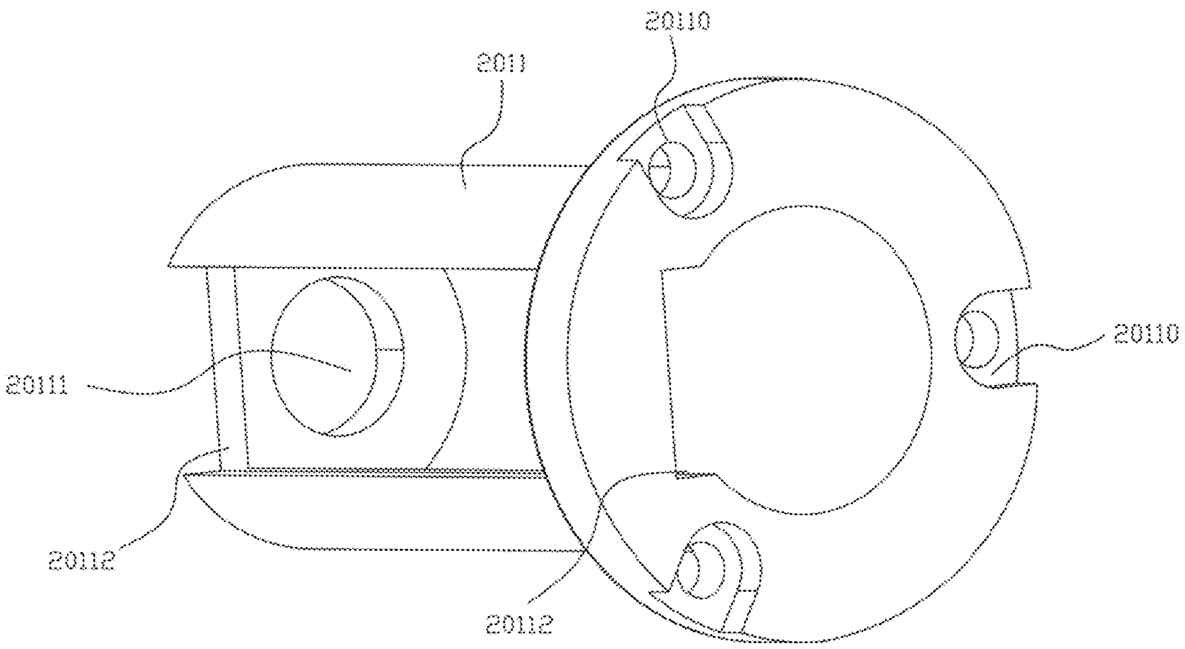
FIG. 12 is a structural diagram of a worm sleeve according to the present invention.
Figure 13:
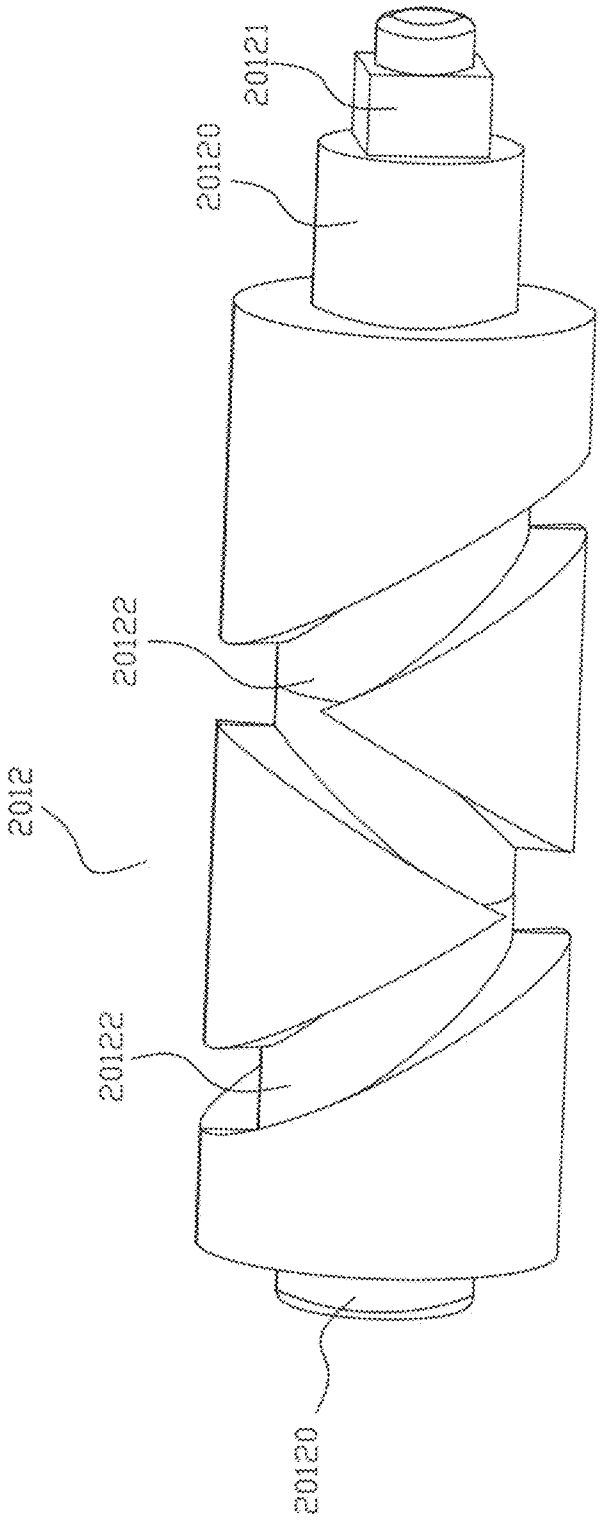
FIG. 13 is a structural diagram of a worm according to the present invention.
Figure 14:
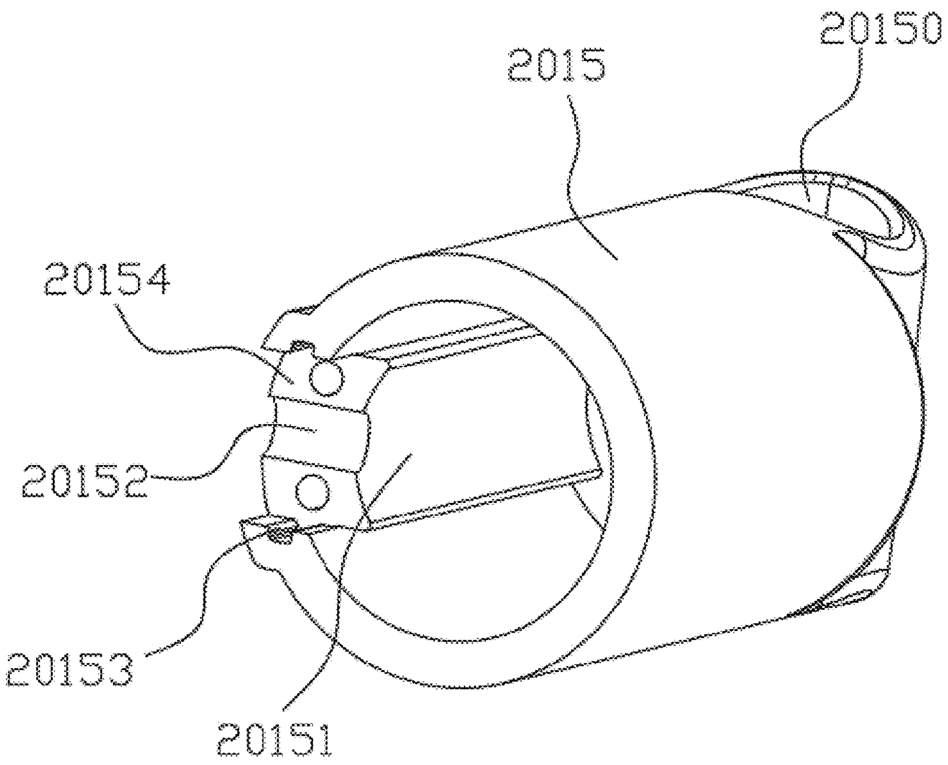
FIG. 14 is a structural diagram of a transmission sleeve according to the present invention.
Figure 15:
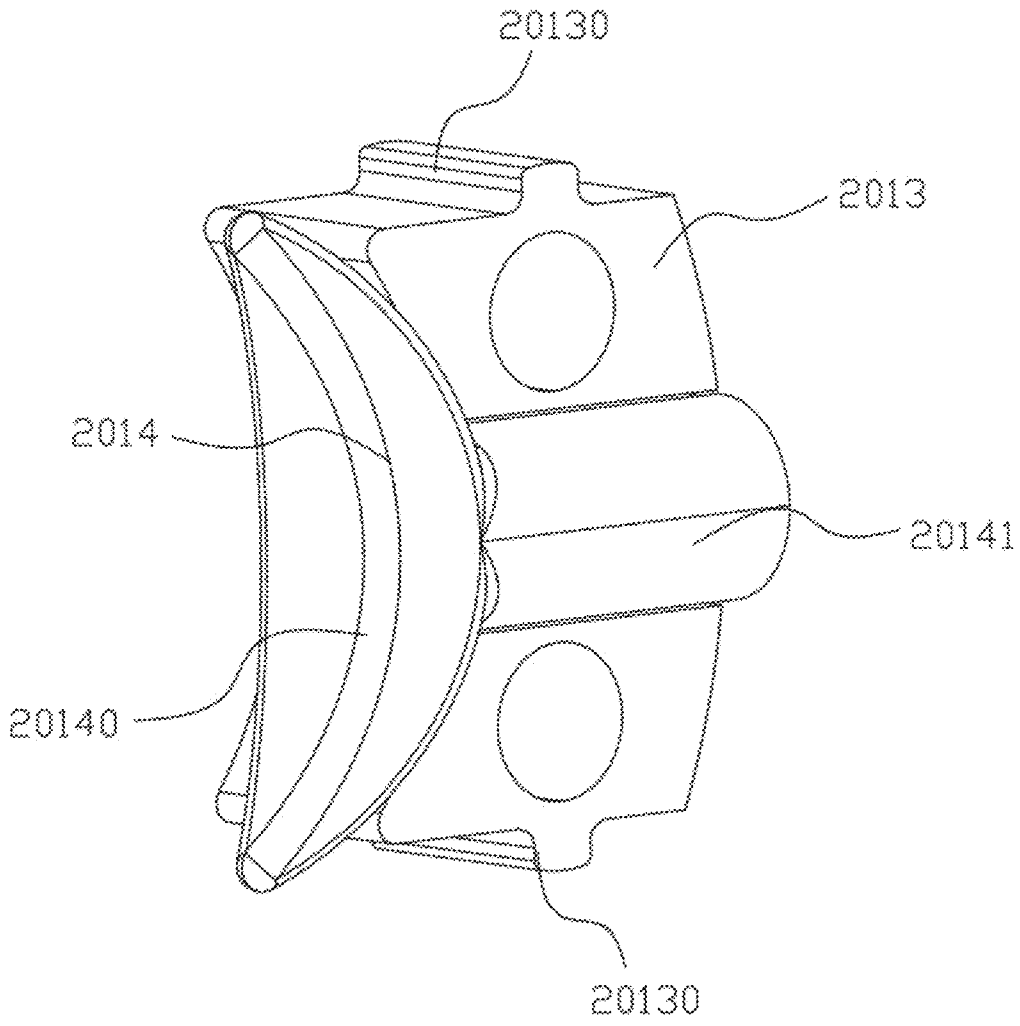
FIG. 15 is a structural diagram of a connection between a locking block and a transmission block according to the present invention.

Further, as shown in FIGS. 8 to 10, a travel groove 1015 is arranged on the inner housing corresponding to the first massage portion 20, and a moving range of the massage column is an area region of the travel groove. The transmission mechanism 201 comprises a rotating block 2010 that rotates synchronously with the first vibration motor and a worm sleeve 2011 that rotates synchronously with the rotating block, the worm 2012 is arranged in the worm sleeve and synchronously rotates along with the rotating block, a transmission sleeve 2015 is sleeved outside the worm sleeve, and the transmission sleeve is connected to the worm sleeve through a locking block 2013 and a transmission block 2014. When the worm rotates, the transmission block pushes the transmission sleeve to move back and forth and left and right, and the massage column 202 is arranged at the end portion of the transmission block and moves along with the transmission sleeve in the travel groove to achieve moving massage. It should be noted that a plurality of groups of massage columns 202 can also be provided, which can achieve massage through simultaneous movement or massage by partially moving back and forth and partially moving left and right, so that the massage effect is better. A part of the outer housing corresponding to the travel groove is arranged in a hollowed-out shape, so that the massage column can directly massage. Therefore, the massage feeling is stronger, and the experience effect is better. Meanwhile, the shape of the massage column is not limited in the present invention, and the end portion of the massage column in any shape should fall within the protection scope of the present invention.

Further, as shown in FIGS. 11 to 15, three groups of convex columns 20100 are arranged on an end surface of the rotating block 2010, and the end surface is connected to the worm sleeve 2011, three groups of convex column holes 20110 corresponding to the worm sleeve are arranged on the worm sleeve, and the convex columns are inserted into the convex column holes to achieve synchronous rotation of the worm sleeve and the rotating block. A first circular hole 20101 is arranged on one end surface of the rotating block facing the worm sleeve, a square hole 20102 is arranged in the first circular hole, a depth of the square hole is greater than that of the first circular hole, a cylindrical end 20120 is arranged on the worm 2012 corresponding to the first circular hole, and a quadrate hole 20121 is arranged corresponding to the square hole, so that the worm can synchronously rotate along with the rotating block. The other end of the worm is also provided with a cylindrical end 20120, the other end of the worm sleeve is provided with a through hole 20111 corresponding to the cylindrical end, and the worm is arranged in the worm sleeve in a connecting mode through the through hole and the first circular hole and rotates synchronously with the second vibration motor. A transmission sleeve 2015 is sleeved outside the worm sleeve 2011, a square opening 20112 is arranged at a side surface of the worm sleeve, and when a square limiting block 20151 is arranged inside the transmission sleeve corresponding to the square opening, the transmission sleeve rotates with the rotation of the worm sleeve. A sinking portion 20154 is provided at one end of the square limiting block, the sinking portion is provided with an arc-shaped groove 20152, clamping grooves 20153 are provided on two sides of the sinking portion, a locking block 2013 and a transmission block 2014 are also arranged in the sinking portion, an upper side and a lower side of the locking block are provided with clamping blocks 20130 corresponding to the clamping grooves so as to fix the transmission block on the transmission sleeve, and a pushing column 20141 is placed in the arc-shaped groove. A sliding block 20140 is arranged at one side of the locking block facing the worm, the worm is provided with a sliding groove 20122 corresponding to the sliding block, and when the transmission block rotates along with the transmission sleeve, the transmission sleeve moves on the sliding groove to enable the transmission sleeve to moving back and forth relative to the worm so as to push the massage column to move back and forth in the travel groove. To increase the stability of transmission, the cross section of the sliding groove is in an inverted “V” shape, the cross section of the corresponding sliding block is in an upright “V” shape, and the sliding grooves are connected end to end in an “8” shape, so that the massage column can achieve massage by moving back and forth in a circulating manner and certain moving massage by moving left and right.

When the massager is used, the massager is inserted into a massage portion, the control button is pressed, the first vibration motor drives the transmission mechanism to move back and forth, and the massage column moves back and forth in the travel groove, so that a moving massage in the front, back, left and right directions is formed; the second vibration motor drives the rotating massage block to rotate, so that the second rotating massage block rotates to drive the second massage portion to rotate, and rotating massage is achieved; meanwhile, the third vibration motor drives the rotating massage column to rotate and drives the inner convex ball to move up and down, so that the convex tongue is driven to slide up and down, and sliding massage on the specific part is achieved. The three massage modes provide targeted massage for specific parts, which has a better massage effect. The three massage modes can also be performed independently or simultaneously, which provides a better massage experience. In addition, the isolating member arranged between every two groups of massagers avoids the transmission of vibration, so that each group of massagers works independently.

According to a massage method in a preferred embodiment of the present invention, the different massage portions are controlled to work by adjusting the buttons, wherein the first vibration motor drives the transmission mechanism to move when working, so that the massage column is pushed to move back and forth and left and right to achieve moving massage; the second vibration motor drives the rotating block to rotate when working, so that the second massage portion rotates to achieve rotating massage; and the third vibration motor drives the rotating column to rotate when working, the inner convex ball swings up and down to achieve sliding massage of the convex tongue in the up and down direction. This method is based on the structure of the above negative pressure massager. The specific structure is as described above and details are not described herein again.

What is claimed is:

1. A massager with a plurality of massage modes, comprising:

an outer housing, a control board arranged in the outer housing, at least one group of massagers are also arranged on the outer housing, each of the group of massagers comprises a first vibration motor and a transmission mechanism connected to the first vibration motor, at least one group of massage columns are arranged at an end portion of the transmission mechanism, the massage columns are moved by the transmission mechanism when the first vibration motor is working, and end portions of the massage columns protrude from the outer housing and move along with the massage columns to achieve moving massage.

2. The massager according to claim 1, wherein the transmission mechanism comprises a rotating block that rotates synchronously with the first vibration motor and a worm that rotates synchronously with the rotating block, a transmission sleeve is sleeved outside the worm, a sliding groove is arranged on the worm, the transmission sleeve is connected to the worm through a transmission block, one end of the transmission block is arranged in the sliding groove, and when the worm rotates, the transmission block rotates and pushes the transmission sleeve to move outside the worm to enable the massage column to move for massage.

3. The massager according to claim 2, wherein the transmission block comprises a sliding block arranged in the sliding groove and a pushing column connected to the transmission sleeve, the sliding block and the pushing column are integrally formed, and the sliding block moves in the sliding groove to enable the pushing column to push the transmission sleeve to move.

4. The massager according to claim 3, wherein the sliding groove is a closed loop, and the sliding block can move back and forth in the sliding groove.

5. The massager according to claim 4, wherein a cross section of the sliding groove is in an inverted V shape, and a cross section of the sliding block is correspondingly in an upright V shape accordingly.

6. The massager according to claim 2, wherein a worm sleeve is sleeved outside of the worm, the transmission sleeve is sleeved outside the worm sleeve, and the worm sleeve and the worm rotate synchronously with the rotating block.

7. The massager according to claim 6, wherein a plurality of groups of convex column holes are arranged on one side of the worm sleeve, a plurality of groups of convex columns corresponding to the convex column holes are arranged on the rotating block, and the convex columns are arranged in the convex column holes to enable the worm sleeve to synchronously rotate along with the rotating block.

8. The massager according to claim 6, wherein two ends of the worm are both provided with cylindrical ends, one end of the worm is connected to a square block, a through hole is arranged at one end of the worm sleeve corresponding to the cylindrical end, a first circular hole is arranged at the rotating block corresponding to the other cylindrical end, a square hole is arranged in the first circular hole corresponding to the square block, and the square block is arranged in the square hole to enable the worm to synchronously rotate along with the rotating block.

9. The massager according to claim 8, wherein a side surface of the worm sleeve is provided with a square opening, a square limiting block is arranged in the transmission sleeve corresponding to the square opening, and the transmission sleeve synchronously rotates along with the worm sleeve and moves on the worm sleeve.

10. The massager according to claim 9, wherein an end portion of the square limiting block is provided with a sinking portion, a locking block is arranged in the sinking portion, and the transmission block is arranged between the locking block and the square limiting block and pushes the transmission sleeve to move outside the worm sleeve.

11. The massager according to claim 10, wherein an upper side and a lower side of the sinking portion are provided with clamping grooves, and an upper end and a lower end of a locking hole are correspondingly provided with clamping blocks.

12. The massager according to claim 10, wherein the sinking portion is provided with an arc-shaped groove, the transmission block is provided with a pushing column corresponding to the arc-shaped groove, and the locking hole is provided with an arc-shaped groove corresponding to the pushing column.

13. The massager according to claim 1, wherein the massager further comprises a second massage portion and a third massage portion, so that the whole massager is Y-shaped.

14. The massager according to claim 13, wherein the second massager comprises a second vibration motor arranged in the outer housing and a rotating massage block connected to the second vibration motor, and the outer housing is provided with a second massage portion corresponding to the rotating massage block to achieve rotating massage.

15. The massager according to claim 13, wherein the third massager comprises a third vibration motor arranged in the outer housing and a rotating massage column connected to the third vibration motor, the outer housing is provided with a convex tongue corresponding to the rotating massage column, an inner convex ball is arranged in the outer housing corresponding to the rotating massage column, the inner convex ball is arranged corresponding to the convex tongue, and the convex tongue achieves sliding massage when the rotating massage column rotates to push the inner convex ball to move up and down.

16. The massager according to claim 13, wherein an inner housing is further arranged in the outer housing, the massagers are placed inside the inner housing, and an isolating member is arranged between every two groups of massagers.

17. The massager according to claim 16, wherein two ends of the isolating member are provided with connecting ends, connecting grooves are arranged on the connecting ends, the inner housing is provided with connecting columns corresponding to the connecting grooves, the connecting columns are clamped into the connecting grooves to connect the inner housing and the isolating member, and the connecting ends are placed inside the inner housing.

18. The massager according to claim 17, wherein the inner housing comprises a left inner housing and a right inner housing, a connection between the left inner housing and the right inner housing is provided with a convex strip and a lower step to increase the sealing performance of the inner housing, the inner housing is provided with a travel groove corresponding to the first massager, and a moving area of the first massager is within an area where the travel groove is located.

* * * * *